United States Patent
Zhang (10) Patent No.: US 11,778,437 B2
(45) Date of Patent: Oct. 3, 2023

(54) METHOD FOR ACQUIRING PUSH INFORMATION, METHOD AND APPARATUS FOR TRANSMITTING PUSH INFORMATION

(71) Applicant: Beijing Xiaomi Intelligent Technology Co., Ltd., Beijing (CN)

(72) Inventor: Yufei Zhang, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 180 days.

(21) Appl. No.: 16/938,755

(22) Filed: Jul. 24, 2020

(65) Prior Publication Data
US 2021/0136544 A1 May 6, 2021

(30) Foreign Application Priority Data
Nov. 6, 2019 (CN) .......................... 201911077851.5

(51) Int. Cl.
*H04L 67/00* (2022.01)
*G06F 9/445* (2018.01)
(Continued)

(52) U.S. Cl.
CPC ................ *H04W 4/50* (2018.02); *G06F 8/71* (2013.01); *H04L 67/04* (2013.01); *H04L 67/34* (2013.01);
(Continued)

(58) Field of Classification Search
CPC .. H04W 4/50; H04W 8/24; G06F 8/71; G06F 8/60; G06F 9/44505; G06F 9/451;
(Continued)

(56) References Cited

U.S. PATENT DOCUMENTS 8,649,768 B1* 2/2014 Gaddam ................ H04M 3/38
455/414.1
9,678,726 B1* 6/2017 Massaguer ................ G06F 8/54
(Continued)

FOREIGN PATENT DOCUMENTS

CN 109729116 A 5/2019

OTHER PUBLICATIONS

CN First Office Action in Application No. 201911077851.5, dated Oct. 28, 2021.
(Continued)

*Primary Examiner* — Joseph E Dean, Jr.
(74) *Attorney, Agent, or Firm* — SYNCODA LLC; Feng Ma (57) ABSTRACT

A method for acquiring push information can be applied to a terminal device and include: transmitting a device model of the terminal device to a server; receiving a push software development kit corresponding to the device model, and a configuration file corresponding to the push software development kit transmitted by the server; initializing the push software development kit based on the configuration file, and completing a registration with the server; and receiving, through the push software development kit, push information transmitted by the server. The terminal device can therefore acquire its corresponding push software development kit according to the device model of the terminal device through a plug-in method, thereby increase push arrival rate and improve quality of operational data.

18 Claims, 6 Drawing Sheets

(51) Int. Cl.
  *G06F 21/10* (2013.01)
  *H04W 4/50* (2018.01)
  *G06F 8/71* (2018.01)
  *H04L 67/04* (2022.01)
  *H04W 8/24* (2009.01)
  *H04L 67/55* (2022.01)
  *G06Q 50/04* (2012.01)

(52) U.S. Cl.
  CPC ............... *H04L 67/55* (2022.05); *H04W 8/24* (2013.01); *G06Q 50/04* (2013.01)

(58) Field of Classification Search
  CPC ... G06F 9/44526; G06F 21/105; H04L 67/04; H04L 67/26; H04L 67/34; H04L 67/06; H04L 67/30; G06Q 50/04; G06Q 30/0631
  See application file for complete search history.

(56) References Cited

U.S. PATENT DOCUMENTS

| | | | | |
|---|---|---|---|---|
| 2011/0154305 | A1* | 6/2011 | LeRoux | G06F 8/71 717/140 |
| 2015/0128105 | A1 | 5/2015 | Sethi et al. | |
| 2017/0147323 | A1* | 5/2017 | Hu | G06F 8/658 |

OTHER PUBLICATIONS

Extended European Search Report in Application No. 20194590.4, dated Feb. 23, 2021.

* cited by examiner

METHOD FOR ACQUIRING PUSH INFORMATION, METHOD AND APPARATUS FOR TRANSMITTING PUSH INFORMATION

CROSS-REFERENCE TO RELATED APPLICATION

This application claims priority to Chinese Patent Application No. 201911077851.5 filed on Nov. 6, 2019, the disclosure of which is hereby incorporated by reference in its entirety.

BACKGROUND

With the development of smart terminal devices, such as mobile phones, tablet computers, laptop computers, desktop computers, etc., there are more and more types of applications (APPs) installed in smart terminal devices. "Push" can be important for APP operations and for daily statistics.

SUMMARY

The present disclosure relates to the field of smart terminal communication, and more specifically, to a method for acquiring push information, a method and an apparatus for transmitting push information, an electronic device, and a computer-readable storage medium.

According to a first aspect of embodiments of the present disclosure, there is provided a method for acquiring push information, which is applied to a terminal device, and the method includes: transmitting a device model of the terminal device to a server; receiving a push software development kit corresponding to the device model and a configuration file corresponding to the push software development kit transmitted by the server; initializing the push software development kit based on the configuration file, and completing a registration with the server; and receiving, through the push software development kit, push information transmitted by the server.

In some embodiments, initializing the push software development kit based on the configuration file, and completing a registration with the server includes: parsing the configuration file to obtain demand parameters and initialization processes of the push software development kit; invoking the demand parameters; generating local components according to the initialization processes on a basis of the demand parameters, and transmitting registration information to the server; and receiving a push identifier transmitted by the server based on the registration information.

In some embodiments, receiving, through the push software development kit, push information transmitted by the server includes: establishing a persistent connection between the terminal device and the server based on the push software development kit corresponding to the device model; and receiving, through the persistent connection, the push information transmitted by the server based on the push identifier.

In some embodiments, the method further includes: transmitting a receipt to the server after receiving the push information transmitted by the server.

In some embodiments, the push software development kit is obtained by performing a secondary encapsulation on an original push file used for pushing information to the device model, and the configuration file corresponding to the push software development kit is generated according to the secondary encapsulation.

According to a second aspect of embodiments of the present disclosure, there is provided a method for transmitting push information, which is applied to a server, and the method includes: receiving a device model of a terminal device transmitted by the terminal device; invoking and transmitting to the terminal device a push software development kit corresponding to the device model and a configuration file corresponding to the push software development kit; completing a registration initiated by the terminal device based on the push software development kit and the configuration file; and transmitting push information to the terminal device.

In some embodiments, completing a registration initiated by the terminal device based on the push software development kit and the configuration file includes: receiving registration information transmitted by the terminal device; and transmitting, in response to the registration information, a push identifier to the terminal device.

In some embodiments, transmitting push information to the terminal device includes: establishing a persistent connection with the terminal device based on the push software development kit corresponding to the device model; and transmitting, through the persistent connection, the push information to the terminal device based on the push identifier.

In some embodiments, the method further includes: receiving a receipt transmitted by the terminal device after transmitting the push information to the terminal device.

In some embodiments, the method further includes: acquiring multiple push software development kits corresponding to multiple device models and multiple configuration files corresponding to multiple push software development kits, wherein the push software development kits are obtained by performing a secondary encapsulation on an original push file used for pushing information, and the configuration files are generated according to the secondary encapsulation.

According to a third aspect of embodiments of the present disclosure, there is provided an apparatus for acquiring push information, which is applied to a terminal device, and the apparatus includes: a transmitting unit, configured to transmit a device model of the terminal device to a server; a receiving unit, configured to receive a push software development kit corresponding to the device model and a configuration file corresponding to the push software development kit transmitted by the server; and receive, through the push software development kit, push information transmitted by the server; and a processing unit, configured to initialize the push software development kit based on the configuration file, and completing a registration with the server.

In some embodiments, the processing unit is further configured to parse the configuration file to obtain demand parameters and initialization processes of the push software development kit; and invoke the demand parameters; the transmitting unit is further configured to generate local components according to the initialization processes on a basis of the demand parameters, and transmit registration information to the server; and the receiving unit is further configured to receive a push identifier transmitted by the server based on the registration information.

In some embodiments, the processing unit is further configured to establish a persistent connection between the terminal device and the server based on the push software development kit corresponding to the device model; and the receiving unit is further configured to receive, through the persistent connection, the push information transmitted by the server based on the push identifier.

In some embodiments, the transmitting unit is further configured to transmit a receipt to the server after receiving the push information transmitted by the server.

In some embodiments, the push software development kit is obtained by performing a secondary encapsulation on an original push file used for pushing information to the device model, and the configuration file corresponding to the push software development kit is generated according to the secondary encapsulation.

According to a fourth aspect of embodiments of the present disclosure, there is provided an apparatus for transmitting push information, which is applied to a server, and the apparatus includes: a receiving unit, configured to receive a device model of a terminal device transmitted by the terminal device; a processing unit, configured to invoke and transmit a push software development kit corresponding to the device model and a configuration file corresponding to the push software development kit to the terminal device; and complete a registration initiated by the terminal device based on the push software development kit and the configuration file; and a transmitting unit, configured to transmit push information to the terminal device.

In some embodiments, the processing unit is further configured to receive, through the receiving unit, registration information transmitted by the terminal device; and transmit, through the transmitting unit and in response to the registration information, a push identifier to the terminal device.

In some embodiments, the processing unit is further configured to establish a persistent connection with the terminal device based on the push software development kit corresponding to the device model; and the transmitting unit is further configured to transmit, through the persistent connection, the push information to the terminal device based on the push identifier.

In some embodiments, the receiving unit is further configured to receive a receipt transmitted by the terminal device after the transmitting unit transmits the push information to the terminal device.

In some embodiments, the receiving unit is further configured to acquire multiple push software development kits corresponding to multiple device models and multiple configuration files corresponding to multiple push software development kits, wherein the push software development kits are obtained by performing a secondary encapsulation on an original push file used for pushing information, and the configuration files are generated according to the secondary encapsulation.

According to a fifth aspect of embodiments of the present disclosure, there is provided an electronic device, comprising: a memory for storing instructions; and a processor for invoking the instructions stored in the memory to perform the method for acquiring push information according to the first aspect or the method for transmitting push information according to the second aspect.

According to a six aspect of embodiments of the present disclosure, there is provided a non-transitory computer-readable storage medium having stored therein instructions that, when executed by a processor, implement the method for acquiring push information according to the first aspect or the method for transmitting push information according to the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

APPs can integrate a push software development kit (PushSDK) to implement the push function. However, mainstream push software development kits in the current market have different push arrival rates in mobile phone systems of respective manufacturers. For example, the push software development kits from manufacturer A have the highest arrival rate in a mobile phone system of manufacturer A, and the mobile phone system from A manufacturer will do some supports for improving the active capability of the push software development kit from manufacturer A, such as maintaining a persistent connection for the push software development kit from manufacturer A. However, the push software development kit from manufacturer A may have a much different arrival rate in the mobile phone system of manufacturer B.

A push software development kit integrated in an APP may have different push effects in the case of a large number of user bases from different mobile phone manufacturers, and may have large errors in the generated push data.

For example, a push software development kit developed by a manufacturer works best on the manufacturer's own brand of mobile phones, but the push effect on other manufacturers' mobile phones may not be satisfactory. At present, in some other technologies, push software development kits from various manufacturers are integrated in an APP. The current device model is determined when the APP is started, and the push software development kit of corresponding manufacturer is loaded to implement push initialization. However, this method has to integrate a large number of software development kits in the APP. Especially in the case that the manufacturers develop their own software development kits, the size of the APP will become huge, which occupies the memory and has high storage costs, and the huge size of the APP will also affect users' download decisions.

Figure 1:
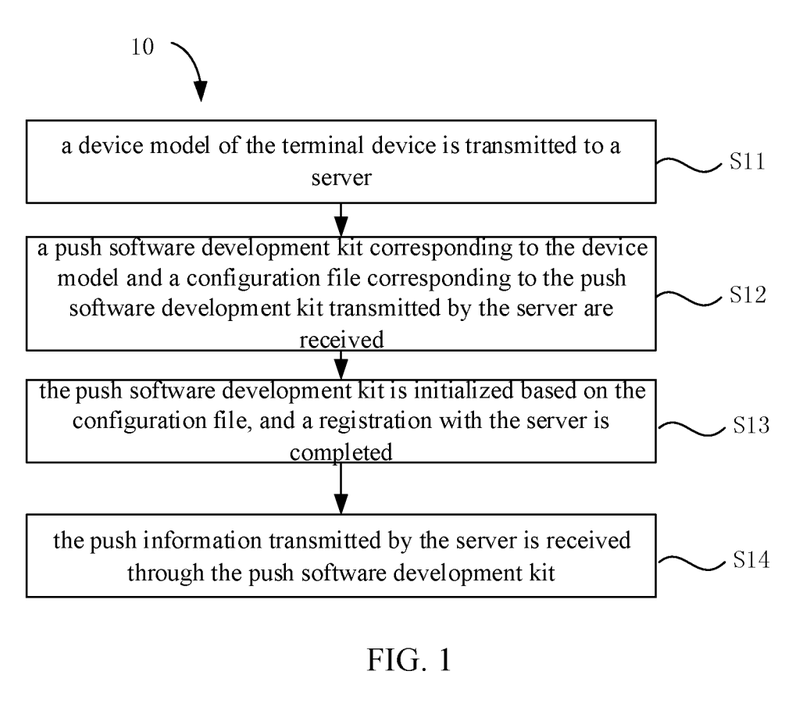
FIG. 1 is a schematic flowchart of a method for acquiring push information according to some embodiments.

Various embodiments of the present disclosure can address these problems, for example, through a method for acquiring push information. Referring to FIG. 1, the method for acquiring push information 10 is applied to a terminal device, and includes steps S11 to S14 as follows.

In step S11: a device model of the terminal device is transmitted to a server.

For example, when an APP is first started, the APP calls the device model of the terminal device and transmits it to the server, and then saves it locally after acquiring the software development kit, without transmitting the device model each time the APP is started; in other cases, it also can be that the device model is transmitted to the server each time the APP is started. The software development kit can be cached locally only, which can save local storage space and facilitates the update of the software development kit.

In step S12: a push software development kit corresponding to the device model and a configuration file corresponding to the push software development kit transmitted by the server are received.

After receiving the device model of the terminal device, the server calls a push software development kit corresponding to the terminal device. Herein, the push software development kit corresponding to the terminal device can be a software development kit developed by a manufacturer of the terminal device and can also be a software development kit most suitable for the terminal device, which aims to ensure that the push software development kit can achieve a higher push arrival rate on this terminal device than those of other push software development kits. The configuration file corresponding to the push software development kit contains the initialization processes of the corresponding push software development kit, the method of executing the push software development kit, and parameters need to be invoked.

In some embodiments, the push software development kit is obtained by performing a secondary encapsulation on an original push file used for pushing information to the device model, and the configuration file corresponding to the push software development kit is generated according to the secondary encapsulation. Herein, the original push file may be a different software development kit or JAR package file (Java Archive File) developed by different manufactures for the APP, and in the present disclosure, in order to use a plug-in form, that is, without integrating the software development kit in the APP but obtaining it afterwards according to the device model, the original push file needs to be performed an secondary encapsulation through the technical documentation of software development kit and compiled into a plug-in form with unified format, and the corresponding configuration file is generated at the same time. Classes, methods and processes that are used according to secondary encapsulation should be written in the configuration file, so that thereafter the content in the push software development kit can be leaned and the reflection execution can be performed through parsing and analyzing in the terminal device.

In step S13: the push software development kit is initialized based on the configuration file, and a registration with the server is completed.

The initialization of the push software development kit is performed through the configuration file, and a registration is completed with the server, so that the server can transmit push information.

Figure 2:
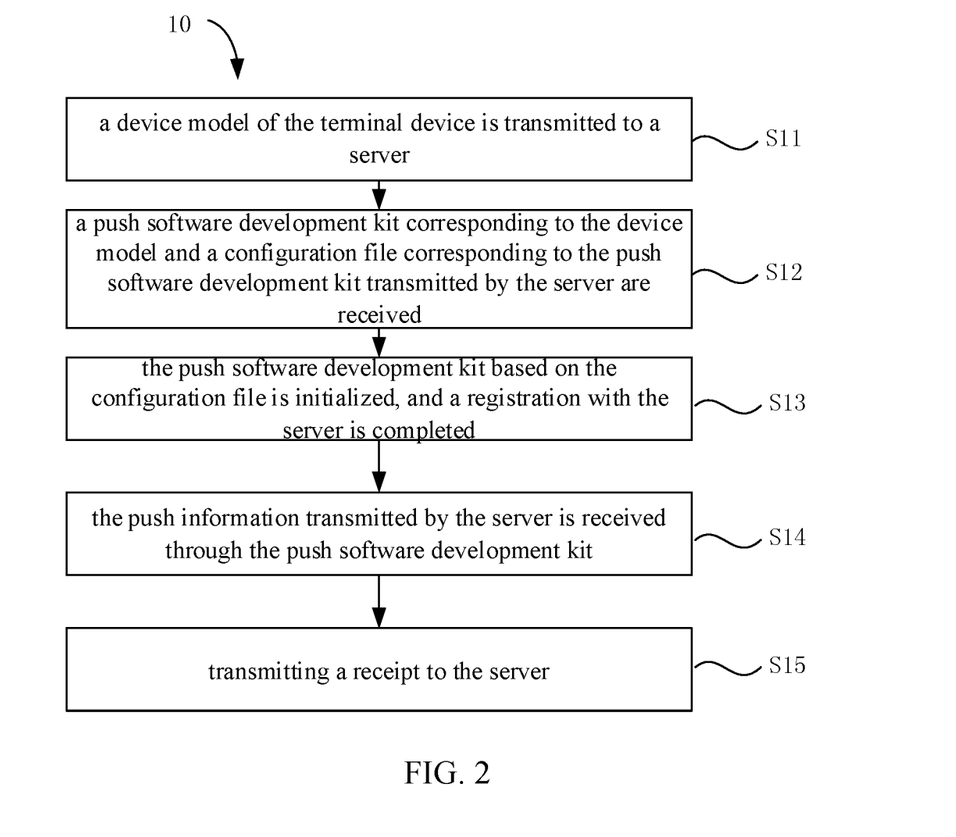
FIG. 2 is a schematic flowchart of another method for acquiring push information according to some embodiments.

In some embodiments, as shown in FIG. 2, the step S13 can include: parsing the configuration file to obtain demand parameters and initialization processes of the push software development kit; invoking the demand parameters; generating local components according to the initialization processes on a basis of the demand parameters, and transmitting registration information to the server; and receiving a push identifier transmitted by the server based on the registration information.

The configuration file and the push software development kit can be received at the same time. The configuration file can be parsed after being received. The configuration file records the initialization processes and the parameters required to execute the push software development kit. After the parsing of configuration file is completed, if the receiving of push software development kit is completed, an initialization can be performed. According to the configuration file, the corresponding data is invoked, and the initialization process is reflected and executed from the push software development kit. Herein, the initialization process can include: generating some components of the push software development kit and transmitting registration information to the server. The registration information can be the device model and APP identifier. After receiving the registration information, the server completes the registration and can transmit a push identifier, such as a region identifier (RegID), to the terminal device, where RegID is the unique identifier of the current APP on the current terminal device and is used by the server to transmit push information.

In step S14: the push information transmitted by the server is received through the push software development kit.

After the push software development kit is initialized, the server can transmit push information to the terminal device, where the push information can be a transparent message or a notification bar message, etc., the specific form of which can be set by the server according to the terminal device.

In some embodiments, the step S14 may include: establishing a persistent connection between the terminal device and the server based on the push software development kit corresponding to the device model; and receiving, through the persistent connection, the push information transmitted by the server based on the push identifier.

By establishing a stable and reliable persistent connection between the server and the terminal device, a service of pushing messages in real time to the APPs on the terminal device can be provided to developers, thereby effectively helping the developers reach users and improving the activity of the APPs.

In some embodiments, as shown in FIG. 2, the method 10 for acquiring push information further includes a step S15: transmitting a receipt to the server after receiving the push information transmitted by the server. In some cases, in order to facilitate the statistics on an arrival rate of push information, the terminal device transmits a receipt to the server after receiving the push information, and the server obtains an arrival rate of push information by calculating a ratio of the number of the receipts and the number of actual transmissions.

Figure 3:
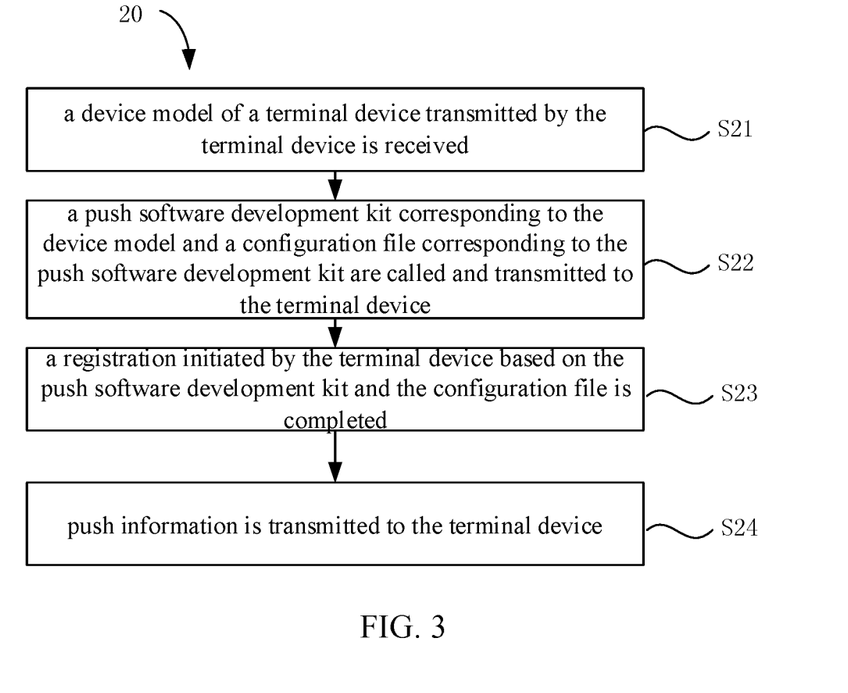
FIG. 3 is a schematic flowchart of a method for transmitting push information according to some embodiments.

Based on a similar concept, as shown in FIG. 3, there is also provides a method 20 for transmitting push information. Referring to FIG. 3, the method 20 for transmitting push information is applied to a server, and includes steps S21 to S24, which are described in detail below:

In step S21: a device model of a terminal device transmitted by the terminal device is received.

As described in the foregoing embodiments, the terminal device transmits the device model thereof to the server when starting an APP, and the server receives the device model.

In step S22, a push software development kit corresponding to the device model and a configuration file corresponding to the push software development kit are invoked and transmitted to the terminal device.

After receiving the device model of the terminal device, the server calls the push software development kit corresponding to the device model and the corresponding configuration file. Herein, the push software development kit corresponding to the terminal device can be a software development kit developed by a manufacturer of the terminal device and can also be a software development kit most suitable for the terminal device, which aims to ensure that the push software development kit can achieve a higher push arrival rate on this terminal device than those of other push software development kits.

In some embodiments, the method 20 for transmitting push information can further include: acquiring multiple push software development kits corresponding to multiple device models and multiple configuration files corresponding to multiple push software development kits, wherein the push software development kits are obtained by performing a secondary encapsulation on an original push file used for pushing information, and the configuration file is generated according to the secondary encapsulation. As described in the foregoing embodiments, the push software development kit is obtained by performing a secondary encapsulation on the original push file corresponding to the terminal device and is compiled into a plug-in form with unified format, so as to facilitate the reception and use by the terminal device. The server first acquires the push software development kit corresponding to each device model, which can be stored on the server, so as to facilitate the invoking of the terminal device. Herein, it should be noted that the device model and the push software development kit can be in a one-to-one correspondence, for example, the software development kit of each manufacturer corresponds to the terminal device of the same manufacturer; it is also possible that multiple device models correspond to one push software development kit. If some terminal device manufacturers make corresponding software development kits, the push software development kit having the relatively highest push arrival rate can be used as the corresponding push software development kit.

In step S23: a registration initiated by the terminal device based on the push software development kit and the configuration file is completed.

In some embodiments, the step S23 can include: receiving registration information transmitted by the terminal device; and transmitting, in response to the registration information, a push identifier to the terminal device.

In step S24: push information is transmitted to the terminal device.

In some embodiments, the step S24 can include: establishing a persistent connection with the terminal device based on the push software development kit corresponding to the device model; and transmitting, through the persistent connection, the push information to the terminal device based on the push identifier.

In some embodiments, the method 20 for transmitting push information can further include: receiving a receipt transmitted by the terminal device after transmitting the push information to the terminal device, so as to make statistics on the arrival number or arrival rate of the push information.

Some methods or steps in the above embodiments correspond to some methods or steps in the foregoing method 10 for acquiring push information. Specific functional effects have been described, and will not be repeated here.

Figure 4:
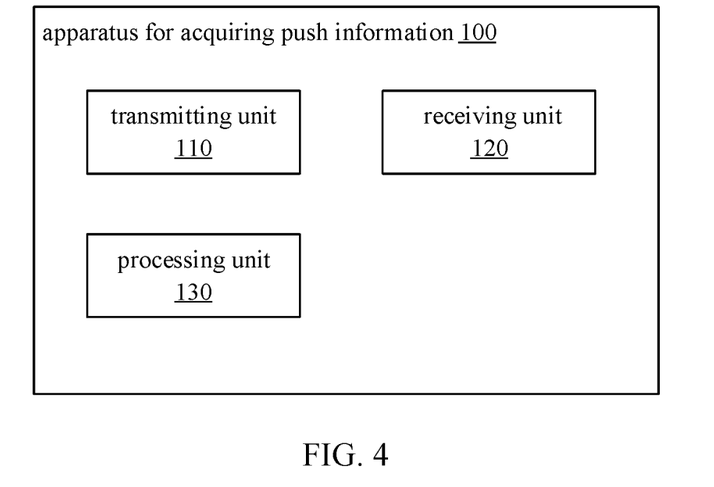
FIG. 4 is a schematic block diagram of an apparatus for acquiring push information according to some embodiments.

Based on a similar concept, FIG. 4 shows an apparatus 100 for acquiring push information. As shown in FIG. 4, apparatus 100 for acquiring push information is applied to a terminal device and includes: a transmitting unit 110, configured to transmit a device model of the terminal device to a server; a receiving unit 120, configured to receive a push software development kit corresponding to the device model and a configuration file corresponding to the push software development kit transmitted by the server; and receive, through the push software development kit, push information transmitted by the server; and a processing unit 130, configured to initialize the push software development kit based on the configuration file, and completing a registration with the server.

In some embodiments, the processing unit 130 is further configured to parse the configuration file to obtain demand parameters and initialization processes of the push software development kit; and invoke the demand parameters; the transmitting unit 110 is further configured to generate local components according to the initialization processes on a basis of the demand parameters, and transmit registration information to the server; and the receiving unit 120 is further configured to receive a push identifier transmitted by the server based on the registration information.

In some embodiments, the processing unit 130 is further configured to establish a persistent connection between the terminal device and the server based on the push software development kit corresponding to the device model; and the receiving unit 120 is further configured to receive, through the persistent connection, the push information transmitted by the server based on the push identifier.

In some embodiments, the transmitting unit 110 is further configured to transmit a receipt to the server after receiving the push information transmitted by the server.

In some embodiments, the push software development kit is obtained by performing a secondary encapsulation on an original push file used for pushing information to the device model, and the configuration file corresponding to the push software development kit is generated according to the secondary encapsulation.

With regard to the apparatus 100 for transmitting push information in the foregoing embodiments, the specific manners in which each unit performs operations have already been described in detail in the embodiments of the method, and will not be described in detail here.

Figure 5:
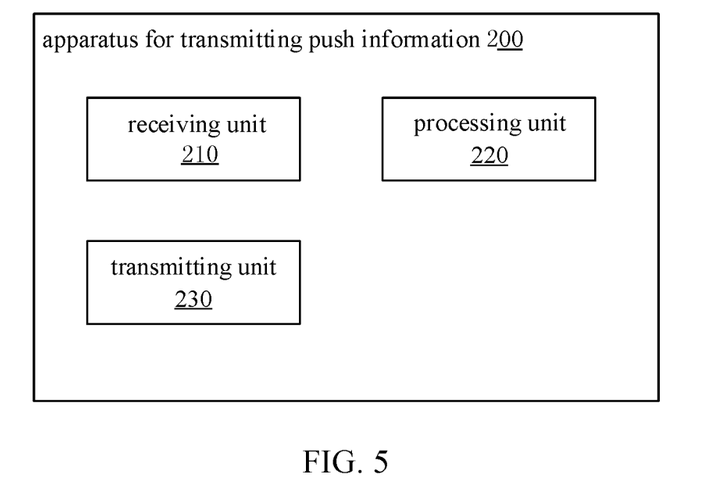
FIG. 5 is a schematic block diagram of an apparatus for transmitting push information according to some embodiments.

Based on a similar concept, FIG. 5 shows an apparatus 200 for transmitting push information. As shown in FIG. 5, the apparatus 200 for transmitting push information is applied to a server, and includes: a receiving unit 210, configured to receive a device model of a terminal device transmitted by the terminal device; a processing unit 220, configured to invoke and transmit to the terminal device a push software development kit corresponding to the device model and a configuration file corresponding to the push software development kit; and complete a registration initiated by the terminal device based on the push software development kit and the configuration file; and a transmitting unit 230, configured to transmit push information to the terminal device.

In some embodiments, the processing unit 220 is further configured to receive, through the receiving unit 210, registration information transmitted by the terminal device; and transmit, through the transmitting unit 230 and in response to the registration information, a push identifier to the terminal device.

In some embodiments, the processing unit 220 is further configured to establish a persistent connection with the terminal device based on the push software development kit corresponding to the device model; and the transmitting unit 230 is further configured to transmit, through the persistent connection, the push information to the terminal device based on the push identifier.

In some embodiments, the receiving unit 210 is further configured to receive a receipt transmitted by the terminal device after the transmitting unit 230 transmits the push information to the terminal device.

In some embodiments, the receiving unit 210 is further configured to acquire multiple push software development kits corresponding to multiple device models and multiple configuration files corresponding to multiple push software development kits, wherein the push software development kits are obtained by performing a secondary encapsulation on an original push file used for pushing information, and the configuration file is generated according to the secondary encapsulation.

With respect to the apparatus 200 for transmitting push information in the above embodiments, the specific manners for performing operations for individual modules therein have already been described in detail in the embodiments regarding the methods, which will not be elaborated herein.

Figure 6:
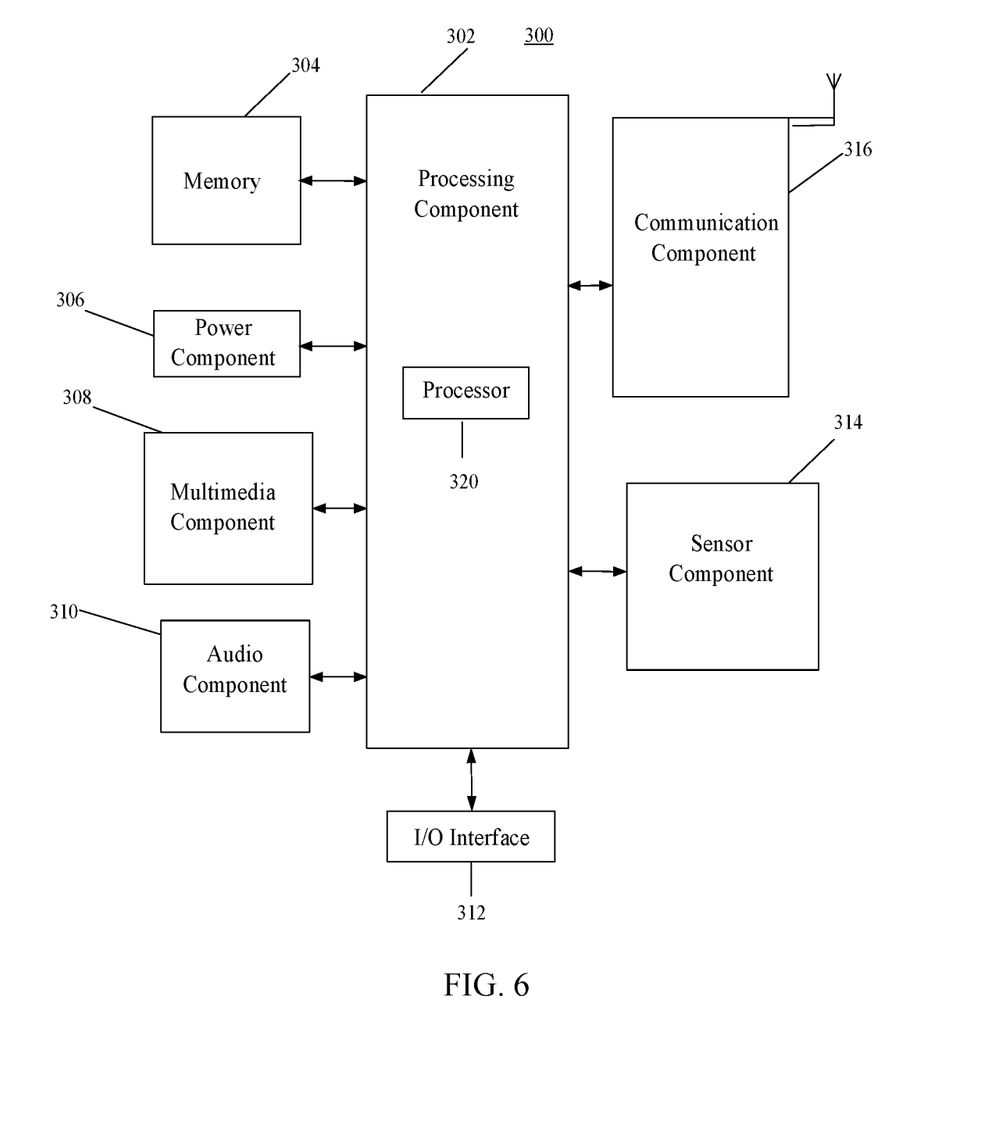
FIG. 6 is a schematic block diagram of an apparatus according to some embodiments.

FIG. 6 is a schematic block diagram of an apparatus of any one of the foregoing embodiments, according to some embodiments. For example, the apparatus 300 can be a mobile phone, a computer, a digital broadcast terminal, a messaging device, a gaming console, a tablet, a medical device, fitness equipment, a personal digital assistant, and the like.

Referring to FIG. 6, the apparatus 300 can include one or more of the following components: a processing component 302, a memory device 304, a power component 306, a multimedia component 308, an audio component 310, an input/output (I/O) interface 312, a sensor component 314, and a communication component 316.

The processing component 302 typically controls overall operations of the apparatus 300, such as the operations associated with display, telephone calls, data communications, camera operations, and recording operations. The processing component 302 can include one or more processors 320 to execute instructions to perform all or part of the steps in the above described methods. Moreover, the processing component 302 can include one or more modules which facilitate the interaction between the processing component 302 and other components. For instance, the processing component 302 can include a multimedia module to facilitate the interaction between the multimedia component 308 and the processing component 302.

The memory 304 is configured to store various types of data to support the operation of the apparatus 300. Examples of such data include instructions for any applications or methods operated on the apparatus 300, contact data, phonebook data, messages, pictures, video, etc. The memory 304 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the apparatus 300. The power component 306 can include a power management system, one or more power sources, and any other components associated with the generation, management, and distribution of power in the apparatus 300.

The multimedia component 308 includes a screen providing an output interface between the apparatus 300 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and the rear camera can receive external multimedia data while the apparatus 300 is in an operation mode, such as a photographing mode or a video mode. Each of the front camera and the rear camera can be a fixed optical lens system or have focus and optical zoom capability.

The audio component 310 is configured to output and/or input audio signals. For example, the audio component 310 includes a microphone (MIC) configured to receive an external audio signal when the apparatus 300 is in an operation mode, such as a invoke mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons can include, but are not limited to, a home button, a volume button, a starting button, and a locking button.

The sensor component 314 includes one or more sensors to provide status assessments of various aspects of the apparatus 300. For instance, the sensor component 314 can detect an open/closed status of the apparatus 300, relative positioning of components, e.g., the display and the keypad, of the apparatus 300, the sensor component 314 can detect a change in position of the apparatus 300 or a component of the apparatus 300, a presence or absence of user contact with the apparatus 300, an orientation or an acceleration/deceleration of the apparatus 300, and a change in temperature of the apparatus 300. The sensor component 314 can include a proximity sensor configured to detect the presence of nearby objects without any physical contact. The sensor component 314 can also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate communication, wired or wirelessly, between the apparatus 300 and other devices. The apparatus 300 can access a wireless network based on a communication standard, such as Wi-Fi, 2G, 3G, 4G, 5G and a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a computer-readable storage medium including instructions, such as the memory 304 including instructions, executable by the processor 320 in the apparatus 300, for performing the above-described methods. For example, the computer-readable storage medium can be a ROM, a RAM, a CD-ROM, a magnetic tape, a floppy disc, an optical data storage device, and the like.

Figure 7:
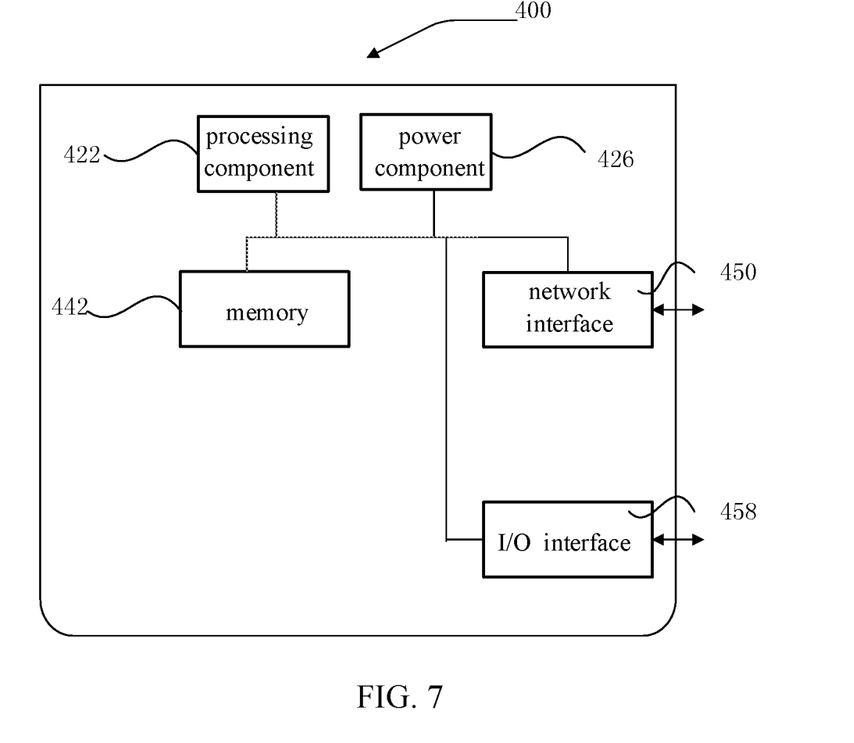
FIG. 7 is a schematic block diagram of an electronic apparatus according to some embodiments.

FIG. 7 is a block diagram of an electric apparatus 400, according to some embodiments. For example, the apparatus 400 can be provided as a server. Referring to FIG. 7, apparatus 400 includes a processing component 422, which further includes one or more processors, and a memory resource represented by a memory 432, for storing instructions executable by the processing component 422, such as an application program. The application program stored in the memory 432 can include one or more modules each corresponding to a set of instructions. In addition, the processing component 422 is configured to execute instructions to perform the method described above.

The apparatus 400 can also include a power component 426 configured to perform power management of the apparatus 300, a wired or wireless network interface 450 configured to connect the apparatus 400 to a network, and an input/output (I/O) interface 458. The apparatus 400 can operate based on an operating system stored in the memory 432, such as Windows Server™, Mac OS X™, Unix™, Linux™, FreeBSD™ or the like.

Various embodiments of the present disclosure can have one or more of the following advantages.

The terminal device can acquire its corresponding push software development kit through a plug-in method according to the device model of the terminal device, thereby increase push arrival rate and improving quality of operational data.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for acquiring push information, applied to a terminal device, comprising:
    transmitting a device model of the terminal device to a server;
    receiving a push software development kit corresponding to the device model and a configuration file corresponding to the push software development kit transmitted by the server;
    initializing the push software development kit based on the configuration file, and completing a registration with the server; and
    receiving, through the push software development kit, push information transmitted by the server,
    wherein the push software development kit is not integrated in the terminal device, and
    the push software development kit is obtained by performing a secondary encapsulation on an original push file used for pushing information to the device model, and the configuration file corresponding to the push software development kit is generated at the same time according to the secondary encapsulation.

2. The method for acquiring push information according to claim 1, wherein said initializing the push software development kit based on the configuration file, and completing a registration with the server comprises:
    parsing the configuration file to obtain demand parameters and initialization processes of the push software development kit;
    invoking the demand parameters;
    generating local components according to the initialization processes on a basis of the demand parameters, and transmitting registration information to the server; and
    receiving a push identifier transmitted by the server based on the registration information.

3. The method for acquiring push information according to claim 2, wherein said receiving, through the push software development kit, push information transmitted by the server comprises:
    establishing a persistent connection between the terminal device and the server based on the push software development kit corresponding to the device model; and
    receiving, through the persistent connection, the push information transmitted by the server based on the push identifier.

4. The method for acquiring push information according to claim 1, further comprising:
    transmitting a receipt to the server after receiving the push information transmitted by the server.

5. An apparatus for implementing the method according claim 1, wherein the apparatus is applied to a terminal device, and the apparatus comprises:
    a memory device having instructions stored thereon; and
    a processor configured to execute the instructions to perform steps of the method.

6. The apparatus according to claim 5, wherein the processor is further configured to:
    parse the configuration file to obtain demand parameters and initialization processes of the push software development kit;
    invoke the demand parameters;
    generate local components according to the initialization process on a basis of the demand parameters, and transmit registration information to the server; and receive a push identifier transmitted by the server based on the registration information.

7. The apparatus according to claim 6, wherein
the processor is further configured to:
establish a persistent connection between the terminal device and the server based on the push software development kit corresponding to the device model; and
receive, through the persistent connection, the push information transmitted by the server based on the push identifier.

8. The apparatus according to claim 5, wherein the processor is further configured to transmit a receipt to the server after receiving the push information transmitted by the server.

9. A network implementing the method according to claim 1, comprising a plurality of mobile terminals from different manufacturers, and the server, wherein each of the plurality of mobile terminals is configured to acquire its corresponding push software development kit through a plug-in according to device model of the each mobile terminal, thereby increasing push arrival rate and improving quality of operational data, and wherein the server is configured to:
receive the device model of the each mobile terminal transmitted by the each mobile terminal;
invoke and transmit to the each mobile terminal the push software development kit corresponding to the device model and the configuration file corresponding to the push software development kit;
complete a registration initiated by the terminal device based on the push software development kit and the configuration file; and
transmit the push information to the each mobile terminal.

10. A method for transmitting push information, applied to a server, the method comprising:
receiving a device model of a terminal device transmitted by the terminal device;
invoking and transmitting to the terminal device a push software development kit corresponding to the device model and a configuration file corresponding to the push software development kit;
completing a registration initiated by the terminal device based on the push software development kit and the configuration file; and
transmitting push information to the terminal device,
wherein the push software development kit is not integrated in the terminal device, and
the push software development kit is obtained by performing a secondary encapsulation on an original push file used for pushing information to the device model, and the configuration file corresponding to the push software development kit is generated at the same time according to the secondary encapsulation.

11. The method for transmitting push information according to claim 10, wherein said completing a registration initiated by the terminal device based on the push software development kit and the configuration file comprises:
receiving registration information transmitted by the terminal device; and
transmitting, in response to the registration information, a push identifier to the terminal device.

12. The method for transmitting push information according to claim 11, wherein said transmitting push information to the terminal device comprises:
establishing a persistent connection with the terminal device based on the push software development kit corresponding to the device model; and
transmitting, through the persistent connection, the push information to the terminal device based on the push identifier.

13. The method for transmitting push information according to claim 10, further comprising:
receiving a receipt transmitted by the terminal device after transmitting the push information to the terminal device.

14. The method for transmitting push information according to claim 10, further comprising:
acquiring multiple push software development kits corresponding to multiple device models and multiple configuration files corresponding to multiple push software development kits, wherein the push software development kits are obtained by performing a secondary encapsulation on an original push file used for pushing information, and the configuration files are generated according to the secondary encapsulation.

15. An apparatus for transmitting push information implementing the method according to claim 6, wherein the apparatus is applied to a server, and the apparatus comprises:
a memory device having instructions stored thereon; and
a processor configured to execute the instructions to perform steps of the method.

16. The apparatus according to claim 15, wherein the processor is further configured to:
receive, through the receiving unit, registration information transmitted by the terminal device; and transmit, through the transmitting unit and in response to the registration information, a push identifier to the terminal device;
establish a persistent connection with the terminal device based on the push software development kit corresponding to the device model; and
transmit, through the persistent connection, the push information to the terminal device based on the push identifier.

17. The apparatus according to claim 15, wherein the processor is further configured to receive a receipt transmitted by the terminal device after the transmitting unit transmits the push information to the terminal device.

18. The apparatus according to claim 15, wherein the processor is further configured to acquire multiple push software development kits corresponding to multiple device models and multiple configuration files corresponding to multiple push software development kits, wherein the push software development kits are obtained by performing a secondary encapsulation on an original push file used for pushing information, and the configuration files are generated according to the secondary encapsulation.

* * * * *